(12) United States Patent
Haneda

(10) Patent No.: US 9,661,210 B2
(45) Date of Patent: May 23, 2017

(54) IMAGE PICKUP DEVICE AND IMAGE PICKUP APPARATUS

(71) Applicant: OLYMPUS CORPORATION, Tokyo (JP)

(72) Inventor: Kazuhiro Haneda, Tokyo (JP)

(73) Assignee: OLYMPUS CORPORATION (JP)

( * ) Notice: Subject to any disclaimer, the term of this patent is extended or adjusted under 35 U.S.C. 154(b) by 0 days.

(21) Appl. No.: 14/687,973

(22) Filed: Apr. 16, 2015

(65) Prior Publication Data

US 2015/0373251 A1     Dec. 24, 2015

(30) Foreign Application Priority Data

Jun. 18, 2014 (JP) ................................. 2014-125635

(51) Int. Cl.
*G02B 13/16* (2006.01)
*H04N 5/225* (2006.01)
*H04N 5/232* (2006.01)
*H04N 5/369* (2011.01)

(52) U.S. Cl.
CPC ..... *H04N 5/23212* (2013.01); *H04N 5/23241* (2013.01); *H04N 5/23245* (2013.01); *H04N 5/3696* (2013.01)

(58) Field of Classification Search
CPC .......... H04N 5/23212; H04N 5/37452; H04N 5/235; H04N 5/3696
USPC ............... 348/335, 340, 345, 348, 350, 352
See application file for complete search history.

(56) References Cited

U.S. PATENT DOCUMENTS

2014/0293118 A1* 10/2014 Yanada .............. H04N 5/23212
                                                              348/350

FOREIGN PATENT DOCUMENTS

JP         2010-028397         2/2010

* cited by examiner

*Primary Examiner* — Yogesh Aggarwal
(74) *Attorney, Agent, or Firm* — Ostrolenk Faber LLP

(57) ABSTRACT

An image pickup device includes a pixel section in which image pixels and phase difference pixels are arranged in a matrix shape, an image-signal generating section that stores pixel signals outputted from the pixel section in a memory section for one or more rows of unit rows, which are rows of unit pixels configured by a plurality of pixels adjacent to each other, combines, for each of the unit rows, the pixel signals of the unit pixels as combined pixel signals, and extracts phase difference pixel signals from the unit row, and an image-signal readout section that reads out, as signals of one row, the combined pixel signals and the phase difference pixel signals of one unit row generated by the image-signal generating section.

9 Claims, 19 Drawing Sheets

| LINE NUMBERS (BEFORE COMBINATION) | COMBINED PIXELS | | | | PHASE DIFFERENCE PIXELS | | | | | |
|---|---|---|---|---|---|---|---|---|---|---|
| 1, 3 | Gr | R | ··· | Gr | R | a | b | c | d | ··· | e |
| 2, 4 | B | Gb | ··· | B | Gb | f | g | i | j | ··· | h |
| 5, 7 | Gr | R | ··· | Gr | R | k | l | m | n | ··· | o |
| 6, 8 | B | Gb | ··· | B | Gb | p | q | s | t | ··· | r |
| 9, 11 | Gr | R | ··· | Gr | R | a' | b' | c' | d' | ··· | e' |
| 10, 12 | B | Gb | ··· | B | Gb | D | D | D | D | D | D |

FIG. 11

| LINE NUMBERS (BEFORE COMBINATION) | COMBINED PIXELS | | | | | PHASE DIFFERENCE PIXELS | | | | | | | | | | |
|---|---|---|---|---|---|---|---|---|---|---|---|---|---|---|---|---|
| 1, 3, 5 | Gr | R | ··· | Gr | R | a | k | b | l | c | m | d | n | ··· | e | o |
| 2, 4, 6 | B | Gb | ··· | B | Gb | f | p | g | q | ··· | h | r | D | D | D | D |
| 7, 9, 11 | Gr | R | ··· | Gr | R | a' | b' | c' | d' | ··· | e' | D | D | D | D | D |
| 8, 10, 12 | B | Gb | ··· | B | Gb | s | t | ··· | D | D | D | D | D | D | D | D |

IMAGE PICKUP DEVICE AND IMAGE PICKUP APPARATUS

CROSS REFERENCE TO RELATED APPLICATION

This application claims benefit of Japanese Application No. 2014-125635 filed in Japan on Jun. 18, 2014, the entire contents of which are incorporated herein by this reference.

BACKGROUND OF THE INVENTION

1. Field of the Invention

The present invention relates to an image pickup device in which image pixels and phase difference pixels are arranged in a matrix shape and an image pickup apparatus including the image pickup device.

2. Description of the Related Art

There has been proposed an image pickup apparatus including an image pickup device in which image pixels and phase difference pixels are arranged in a matrix shape and an image pickup apparatus that performs so-called image plane phase difference AF.

For example, Japanese Patent Application Laid-Open Publication No. 2010-28397 describes a technique for, in an image pickup apparatus including an image pickup device, on an image plane of which phase difference pixels are arranged, performing readout out of a plurality of pixels in a first mode for adding up and reading out signals of any number of pixels including the phase difference pixels and a second mode for thinning out signals of a part of pixels and reading out signals of at least the phase difference pixels. That is, in the first mode for acquiring a movie (including a live view), in order to secure a frame rate, pixel signals are added up (that is, processed to reduce the number of pixel signals to be read out) and read out. On the other hand, in the second mode for performing the phase difference AF, the phase difference pixels are read out without performing the addition of the pixel signals. The phase difference pixels are acquired in the second mode at a ratio of one frame in a predetermined number of frames. Added-up pixel signals for an image in the first mode are acquired in the other frames.

SUMMARY OF THE INVENTION

An image pickup device according to an aspect of the present invention includes: a pixel section in which pixels for generating pixel signals for an image and pixels for generating pixel signals for focus detection are arranged in a matrix shape, the pixel section outputting the generated pixel signals; an image-signal generating section including a storing section that stores, when a plurality of pixels arranged in the matrix shape in the pixel section are divided into unit pixels configured by a plurality of pixels adjacent to one another, the pixel signals outputted from the pixel section for at least one row of unit rows configured by arrangement of the unit pixels in a row direction, the image-signal generating section generating, on the basis of the pixel signals stored in the storing section, for each of the unit rows, combined pixel signals obtained by combining the pixel signals related to the unit pixels and phase difference pixel signals for the focus detection extracted from each of the unit rows; and an image-signal readout section that reads out, as signals of one row, the combined pixel signals and the phase difference pixel signals related to one unit row generated by the image-signal generating section.

An image pickup apparatus according to an aspect of the present invention includes: the image pickup device; an image processing section that subjects the combined pixel signals read out from the image pickup device to image processing and generates image signals for a moving image or a still image; a first focus detecting section that performs, on the basis of the phase difference pixel signals read out from the image pickup device, focus detection based on a phase difference method; and a second focus detecting section that performs, on the basis of the combined pixel signals read out from the image pickup device, focus detection based on a contrast method.

BRIEF DESCRIPTION OF THE DRAWINGS

FIG. 5 is a diagram showing a basic pixel arrangement in a pixel section in the first embodiment;

FIG. 6 is a diagram in which identification signs are attached to phase difference pixels in order to explain readout order from an image-signal readout section in a moving image mode in the first embodiment;

FIG. 10 is a diagram showing a pixel configuration obtained by the readout order shown in FIGS. 7 to 9 in the first embodiment;

FIG. 11 is a diagram showing a configuration of output pixels from the image pickup device at the time when a unit pixel is configured by the same color pixel group including 3×3 pixels in the first embodiment;

FIG. 12 is a diagram showing arrangement of Gr and R lines in the pixel section in the first embodiment;

FIG. 13 is a diagram showing arrangement of Gb and B lines in the pixel section in the first embodiment;

DETAILED DESCRIPTION OF THE PREFERRED EMBODIMENTS

Embodiments of the present invention are explained below with reference to the drawings.

[First Embodiment]

Figure 1:
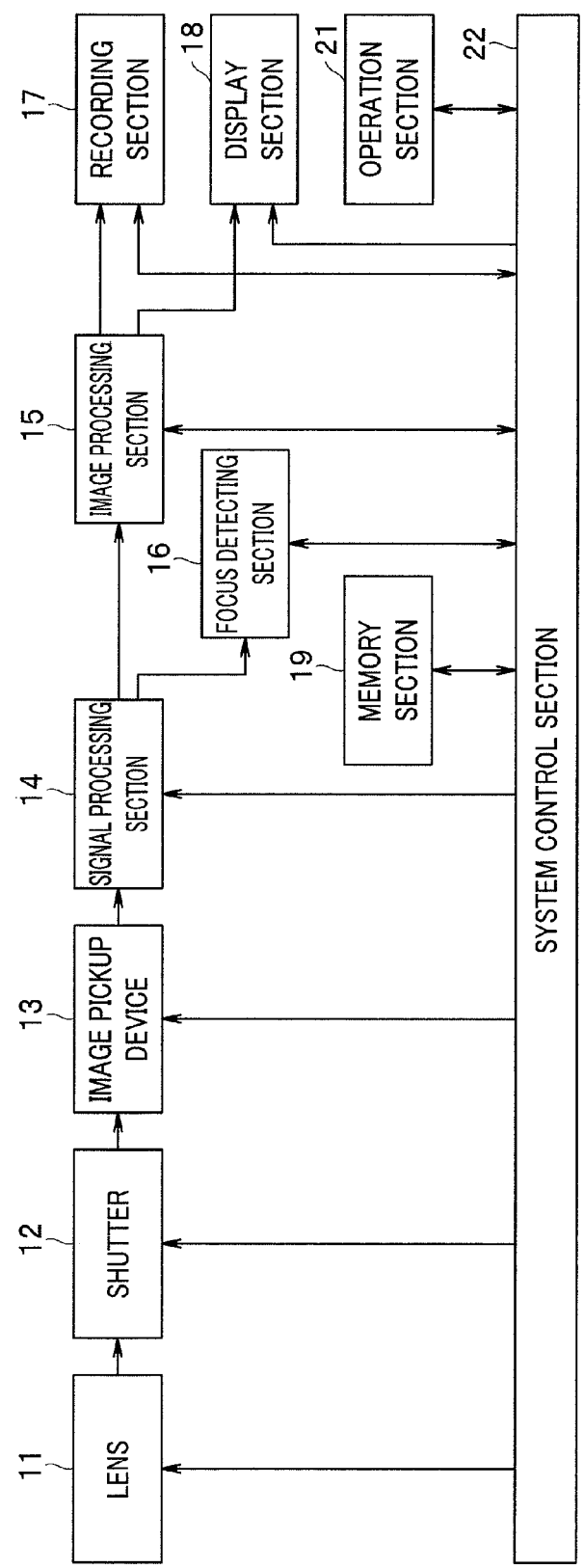
FIG. 1 is a block diagram showing a configuration of an image pickup apparatus in a first embodiment of the present invention.

FIGS. 1 to 18 show a first embodiment of the present invention. FIG. 1 is a block diagram showing a configuration of an image pickup apparatus.

The image pickup apparatus in the present embodiment includes a lens 11, a shutter 12, an image pickup device 13, a signal processing section 14, an image processing section 15, a focus detecting section 16, a recording section 17, a display section 18, a memory section 19, an operation section 21, and a system control section 22.

The lens 11 is a photographing optical system that forms an optical image of an object on the image pickup device 13. More specifically, the lens 11 includes a focus lens and an optical diaphragm. Driving control for the focus lens and the optical diaphragm is performed by the system control section 22. When the lens 11 is an electric zoom lens, driving control for zoom is also performed by the system control section 22.

The shutter 12 controls time in which a light beam from the lens 11 reaches the image pickup device 13. The shutter 12 is configured as a mechanical shutter such as a focal plane shutter having a configuration for causing a shutter curtain to travel. During still image photographing, the shutter 12 controls, on the basis of the driving control by the system control section 22, time in which the light beam reaches the image pickup device 13, that is, an exposure time of the object by the image pickup device 13. On the other hand, during a moving image mode (including a moving image photographing mode and a live view; the same applies in the following explanation), the shutter 12 is maintained in an open state. The control of the exposure time is performed by a so-called device shutter.

The image pickup device 13 is configured as, for example, a single-plate CMOS image pickup device including a color filter of a primary color Bayer array. The image pickup device 13 is an image pickup section that photoelectrically converts the optical image of the object and outputs a pixel signal on the basis of the driving control by the system control section 22. It goes without saying that the image pickup device 13 is not limited to the single-plate CMOS image pickup device.

As explained below, the image pickup device 13 generates a pixel signal including a pixel signal for forming a still picture or a movie (an image pixel signal) and a pixel signal for performing focus detection by phase difference AF processing (a phase difference pixel signal).

During still image photographing, the image pickup device 13 outputs, for example, the image pixel signal to the image processing section 15. During the moving image mode, in order to secure a frame rate of the movie, the image pickup device 13 combines a plurality of pixel signals included in a unit pixel explained below (e.g., all pixel signals included in the unit pixel or all image pixel signals included in the unit pixel) to generate combined pixel signals and outputs the generated combined pixel signals to the image processing section 15 and the focus detecting section 16 (however, the still picture may be generated on the basis of the combined pixel signals).

Further, during the moving image mode, the image pickup device 13 outputs the phase difference pixel signals to the focus detecting section 16 in a necessary frame on the basis of the control by the system control section 22.

The signal processing section 14 applies processing such as noise reduction processing and signal amplification to the pixel signal outputted from the image pickup device 13. However, the image pickup device 13 of a type for performing, on the inside, processing same as the processing of the signal processing section 14 may be used. In this case, the signal processing section 14 may be omitted.

The image processing section 15 subjects the combined pixel signals or the image pixel signals read out from the image pickup device 13 to image processing and generates image signals for a moving image or a still image. The image processing section 15 applies various kinds of correction processing such as shading processing, white balance processing, gamma correction processing, and defective pixel correction processing and image processing such as demosaicking processing to the pixel signal outputted from the image pickup device 13. The image processing section 15 applies, according to necessity, pixel value correction processing to the combined pixel signals outputted from the image pickup device 13 during the moving image mode. As explained below, a phase difference pixel is a pixel, a pixel aperture of which is limited compared with an image pixel. An output pixel value of the phase difference pixel is smaller than an output pixel value of the image pixel. Therefore, the pixel value correction processing performs pixel value correction for a combined pixel signal obtained by combining pixels to include such a phase difference pixel.

The focus detecting section 16 functions as both of a first focus detecting section that performs focus detection based on the phase difference method (phase difference AF) on the basis of the phase difference pixel signals read out from the image pickup device 13 and a second focus detecting section that performs focus detection based on the contrast method (contrast AF) on the basis of the combined pixel signals read out from the image pickup device 13. That is, the first focus detecting section detects phase difference information of an object image from the phase difference pixel signals outputted from the image pickup device 13 and calculates lens control parameters for focusing. Further, the second focus detecting section detects contrast information of the object image from the combined pixel signals or the image pixel signals outputted from the image pickup device 13 and calculates, on the basis of the contrast information of a plurality of frames, lens control parameters for focusing. The phase difference detection and the contrast detection can also be simultaneously performed.

The recording section 17 stores, in a nonvolatile memory, the pixel signal for recording (the still picture, the movie, etc.) outputted from the image processing section 15. The recording section 17 is configured by, for example, a built-in flash memory built in the image pickup apparatus or an SD memory card detachably attachable to the image pickup apparatus. Therefore, the recording section 17 does not need to be a component peculiar to the image pickup apparatus.

The display section 18 is configured by, for example, an electronic viewfinder (EVF) and a back display panel. The display section 18 displays an image based on a pixel signal for display outputted from the image processing section 15. The image display performed by the display section 18 includes rec view display for displaying a pixel signal immediately after still image photographing only for a short time, moving image display during moving image photographing, live view display, and reproduction display of a JPEG file recorded in the recording section 17. The display section 18 displays an image and also displays various kinds of information related to the image pickup apparatus. Note that the display section 18 may be configured by a portable device or the like communicably connected to the image pickup apparatus via a wireless LAN or the like.

The memory section 19 is a storing section configured by, for example, a DRAM (dynamic random access memory). The memory section 19 temporarily stores a pixel signal. For example, the memory section 19 is used as a memory region for buffering a pixel signal used when the image processing section 15 performs image processing, a pixel signal used by the focus detecting section 16 to perform focus detection, a pixel signal to be recorded by the recording section 17, a pixel signal read out from the recording section 17, a pixel signal to be displayed on the display section 18, and the like.

The operation section 21 is a section for performing various operation inputs to the image pickup apparatus. The operation section 21 is configured by, for example, operation buttons and operation switches or a touch panel function provided on a back display panel. Note that, as the operation section 21, remote release or a remote controller function of a smart phone, a tablet PC, or the like may be used.

Functions realized by the operation section 21 include functions of, for example, a power button for turning on and off a power supply of the image pickup apparatus, a release button for instructing a start of photographing of an image, a reproduction button for performing reproduction of a recorded image, a menu button for performing setting and the like of the image pickup apparatus, a cross key used for selection operation of items, and an OK button used for deciding operation of a selected item. Items that can be set using the menu buttons, the cross key, the OK button, and the like include photographing modes (a still image photographing mode, a moving image photographing mode, etc.), a reproduction mode, AF modes (a normal AF mode, a regular AF mode, etc.), and resolutions (corresponding to thinning-out ratios explained below) of images in the photographing modes. In an example of a moving image, as an HD (high definition) moving image, there are a plurality of types having different resolutions and frame rates. A user can set via the operation section 21 which type of the HD moving image is photographed. When operation is performed on the operation section 21, a signal corresponding to operation content is outputted to the system control section 22.

The system control section 22 is a control section including, for example, a CPU. The system control section 22 collectively controls the entire image pickup apparatus. The system control section 22 executes, according to a predetermined processing program stored in a nonvolatile memory, various processing sequences corresponding to operation inputs from the operation section 21. For example, the system control section 22 performs driving control of the lens 11 on the basis of the lens control parameters outputted from the focus detecting section 16. The system control section 22 drive-controls the shutter 12 and the device shutter of the image pickup device 13 according to release operation of the operation section 21 and performs exposure control of the image pickup device 13. Further, when the first focus detecting section of the focus detecting section 16 does not perform focus detection, the system control section 22 controls an image-signal readout section 28 explained below of the image pickup device 13 not to output a pixel signal. In addition, the system control section 22 determines whether at least one of an object condition and a photographing condition changes. When determining that at least one of the object condition and the photographing condition changes, the system control section 22 causes the image-signal readout section 28 explained below of the image pickup device 13 to read out phase difference pixel signals and controls the first focus detecting section of the focus detecting section 16 to perform focus detection.

Figure 2:
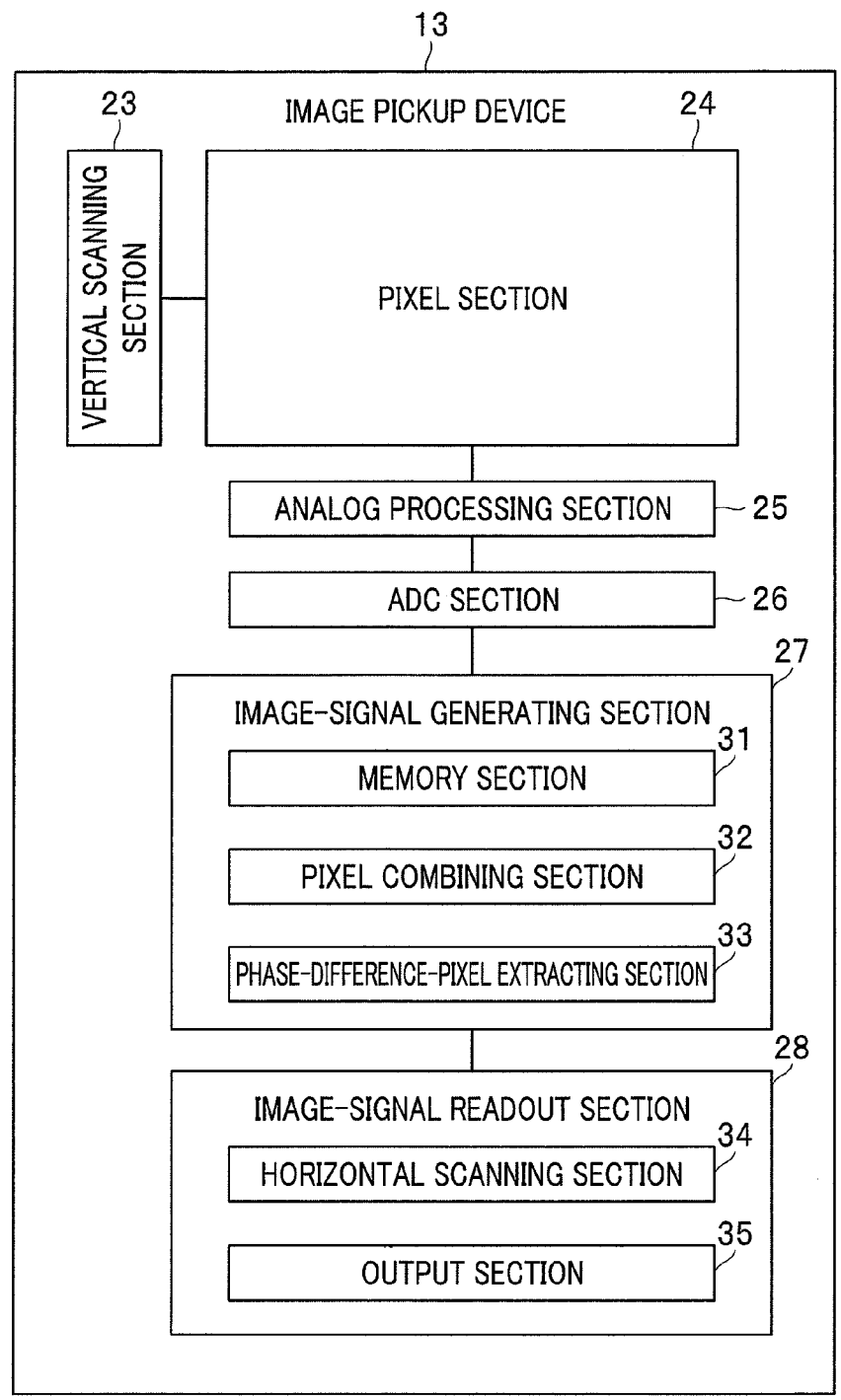
FIG. 2 is a block diagram showing a configuration of an image pickup device in the first embodiment.

Next, FIG. 2 is a block diagram showing the configuration of the image pickup device 13.

The image pickup device 13 includes a vertical scanning section 23, a pixel section 24, an analog processing section 25, an ADC section 26, an image-signal generating section 27, and an image-signal readout section 28.

In the pixel section 24, pixels for generating a pixel signal for an image and pixels for generating a pixel signal for focus detection (more specifically, phase difference pixels for image plane focus detection) are arranged in a matrix shape. The pixel section 24 outputs a generated pixel signal.

The vertical scanning section 23 is a circuit section that controls an accumulation time of the respective pixels arranged in the pixel section 24 and controls scanning in a vertical direction of pixels to be read out.

The analog processing section 25 is a circuit section that applies amplification by a preamplifier and analog signal processing such as a correlated double sampling by a CDS circuit to analog pixel signals read out from the pixel section 24.

The ADC section 26 is an A/D conversion section that A/D-converts the analog pixel signals outputted from the pixel section 24 and processed by the analog processing section 25 and outputs digital pixel signals. Specific examples of the ADC section 26 include an ADC section of a type for A/D-converting the pixel signals of the pixel section 24 with an analog digital converter (ADC) for each column represented by a column ADC.

The image-signal generating section 27 generates pixel signals to be read out by the image-signal readout section 28. The image-signal generating section 27 includes a memory section 31, a pixel combining section 32, and a phase-difference-pixel extracting section 33. Here, the image-signal generating section 27 generates, on the basis of digital pixel signals stored in the memory section 31, digital combined pixel signals and digital phase difference pixel signals.

The memory section 31 is a storing section that stores, when a plurality of pixels arranged in a matrix shape in the pixel section 24 are divided into unit pixels configured by a plurality of pixels adjacent to one another (in the case of color, a plurality of pixels of the same color adjacent to one another), the pixel signals outputted from the pixel section 24 for at least one row of unit rows configured by arrangement of in a row direction of the unit pixels (for at least pixel signals necessary for processing of the pixel combining section 32 and the phase-difference-pixel extracting section 33). The memory section 31 in the present embodiment stores the digital pixel signals A/D-converted by the ADC section 26. The memory section 31 is configured by, for example, a volatile memory circuit. Specific examples of the memory section 31 include a DRAM and a line memory. However, the memory section 31 is not limited to a specific configuration.

The pixel combining section 32 generates, during the moving image mode, on the basis of the pixel signals stored in the memory section 31, for each of the unit rows, combined pixel signals obtained by combining pixel signals related to the unit pixels. More specifically, the pixel combining section 32 selects or reads out, concerning the pixel signals in the unit row stored in the memory section 31, for each of the unit pixels, pixel signals in the unit pixel, subjects the pixel signals to, for example, averaging processing (but not limited to the averaging processing), and generates a result of the averaging processing as combined pixel signals. Consequently, the number of pixels for an image is subjected to thinning-out processing for each of the unit pixels (a reduction in an output pixel configuration with respect to a pixel configuration of the pixel section 24; including a reduction by addition (so-called addition thinning-out)). Note that a thinning-out ratio (more specifically, a row thinning-out ratio and a column thinning-out ratio) is defined in advance according to the moving image photographing mode (a live view moving image, the plurality of kinds of HD moving images described above, etc.). Therefore, the unit pixels and the unit rows are determined by the system control section 22 according to the set thinning-out ratio.

The phase-difference-pixel extracting section 33 generates, on the basis of the pixel signals stored in the memory section 31, for each of the unit rows, phase difference pixel signals for focus detection extracted from the unit row. More specifically, the phase-difference-pixel extracting section 33 performs extraction of the phase difference pixel signals by selecting or reading out the phase difference pixel signals included in the unit row stored in the memory section 31.

The image-signal readout section 28 reads out, as signals of one row, the combined pixel signals and the phase difference pixel signals (both of which are digital signals here) related to one unit row generated by the image-signal generating section 27. The image-signal readout section 28 includes a horizontal scanning section 34 and an output section 35.

The horizontal scanning section 34 sequentially reads out, for each of the rows, as signals of one row, the combined pixel signals and the phase difference pixel signals related to one unit row generated by the image-signal generating section 27. The horizontal scanning section 34 in the present embodiment arranges, for each of the unit rows, in series, a pixel signal group in which only combined pixel signals are arrayed and a pixel signal group in which only phase difference pixel signals are arrayed and reads out the pixel signal groups as signals of one row. However, the combined pixel signals and the phase difference pixel signals may be read out in appropriate mixed order and later, in the signal processing section 14 or the like, the pixel signal group in which only the combined pixel signals are arrayed and the pixel signal group in which only the phase difference pixel signals are arrayed may be rearranged in order in which the pixel signal groups are arranged in series.

The output section 35 applies parallel serial conversion, conversion processing into a differential signal, or the like to the pixel signals read out by the horizontal scanning section 34, and sequentially outputs the resulting signals from the image pickup device 13.

Figure 3:
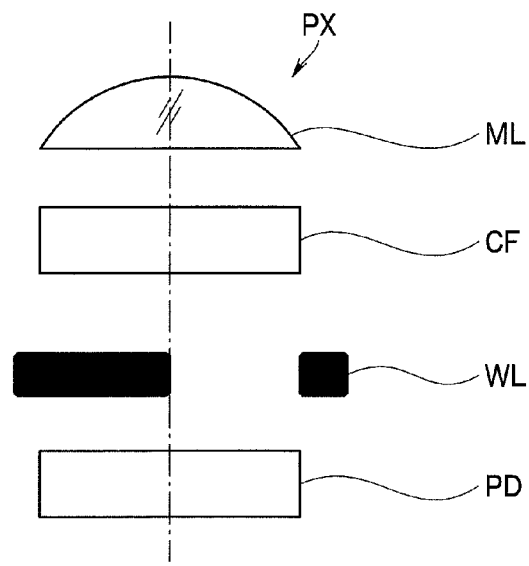
FIG. 3 is a diagram showing a configuration of a phase difference pixel along a ray direction in the first embodiment.
Figure 4:
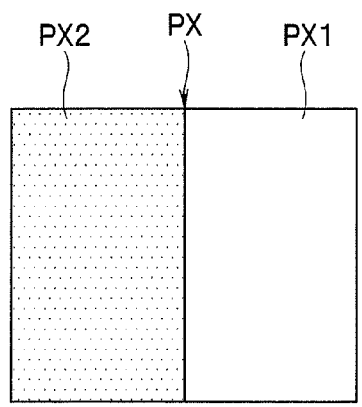
FIG. 4 is a plan view showing a configuration of the phase difference pixel in the first embodiment.

Next, FIG. 3 is a diagram showing a configuration of a phase difference pixel along a ray direction and FIG. 4 is a plan view showing a configuration of the phase difference pixel.

As shown in FIG. 3, each of pixels PX arranged in a matrix shape in the pixel section 24 includes a micro lens ML, a color filter CF, a wiring layer WL, and a photodiode PD along a thickness direction of a substrate on which the pixel section 24 is configured (along a direction of a ray made incident from the object).

The micro lens ML substantially increases a pixel aperture ratio by condensing, on the photodiode PD, the ray made incident from the object.

The color filter CF limits a wavelength band of the ray made incident on the photodiode PD. When a color filter array of a primary color Bayer array is provided in the pixel section 24, the color filter CF that allows light in any one wavelength band among green (G), blue (B), and red (R) to pass is arranged on the photodiode PD. However, concerning the phase difference pixel, a color filter of any one color (e.g., any one color conforming to the primary color Bayer array) may be arranged. However, the phase difference pixel may be configured as a white pixel, which does not perform particular wavelength band limitation, to improve light reception sensitivity.

The wiring layer WL is a layer in which wires connecting circuits connected to the photodiode PD are configured. The wiring layer WL is configured as a layer in which metal or the like having electric conductivity is used. Therefore, in the phase difference pixel shown in FIGS. 3 and 4, the wiring layer WL is also used as a light blocking film that limits a part of an aperture of the photodiode PD. More specifically, the phase difference pixel shown in FIGS. 3 and 4 is a right aperture pixel Ri constituting a pixel in which a left aperture PX2 is shaded by the wiring layer WL and only a right aperture PX1 receives light.

The photodiode PD is a photoelectric conversion section that photoelectrically converts the ray made incident thereon and generates a pixel signal corresponding to a light amount of the ray.

Figure 5:
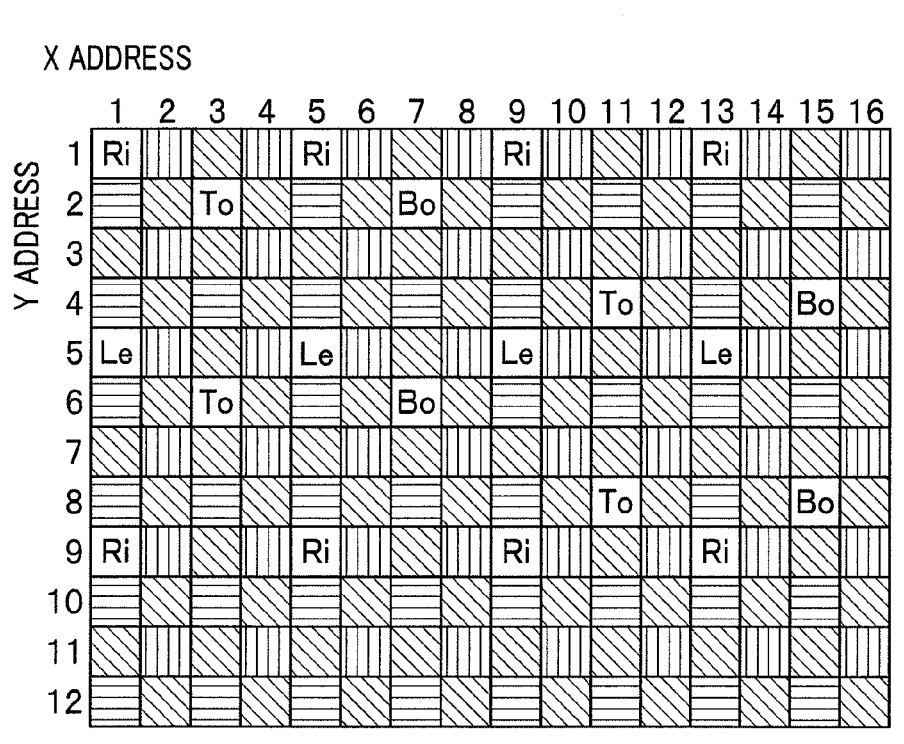

Next, FIG. 5 is a diagram showing a basic pixel arrangement in the pixel section 24.

The pixel section 24 is configured by two-dimensionally laying the basic pixel arrangement of 16 pixels in a horizontal direction×12 pixels in a vertical direction shown in FIG. 5.

First, image pixels (excluding portions where phase difference pixels are arranged) are arrayed in the primary color Bayer array. In the primary color Bayer array, as it is well known, with 2×2 pixels set as a basic Bayer array, green (G) pixels are arranged in one diagonal direction in the basic Bayer array and red (R) pixels and blue (B) pixels are arranged in the other diagonal direction. In the figure, the green (G) pixels are hatched by right oblique downward lines, the red (R) pixels are hatched by vertical lines, and the blue (B) pixels are hatched by horizontal lines. Note that, in the following explanation, the green (G) pixels arranged on lines same as lines of the red (R) pixels are referred to as Gr pixels and the green (G) pixels arranged on lines same as lines of the blue (B) pixels are referred to as Gb pixels as appropriate.

When horizontal direction positions of the basic pixel arrangement of 16×12 pixels shown in FIG. 5 are represented by X addresses of 1 to 16 and vertical direction positions of the basic pixel arrangement are represented by Y addresses of 1 to 12, right aperture (left shaded) pixels Ri, left aperture (right shaded) pixels Le, upper aperture (lower shaded) pixels To, and lower aperture (upper shaded) pixels Bo are respectively arranged in positions where a two-dimensional address (X, Y) is addresses described below.

Ri: (1, 1), (5, 1), (9, 1), (13, 1), (1, 9), (5, 9), (9, 9), (13, 9)
Le: (1, 5), (5, 5), (9, 5), (13, 5)
To: (3, 2), (11, 4), (3, 6), (11, 8)
Bo: (7, 2), (15, 4), (7, 6), (15, 8)

The first focus detecting section of the focus detecting section 16 detects phase difference information of a vertical line component of the object on the basis of pixel signals obtained from a group of the right aperture pixels Ri (e.g., a group in which the Y address is 1) and pixel signals obtained from a group of the left aperture pixels Le (e.g., a group in which the Y address is 5) and detects phase difference information of a horizontal line component of the object on the basis of pixel signals obtained from a group of the upper aperture pixels To (e.g., a group in which the X address is 3) and pixel signals obtained from a group of the lower aperture pixels Bo (e.g., a group in which the X address is 7).

Figure 6:
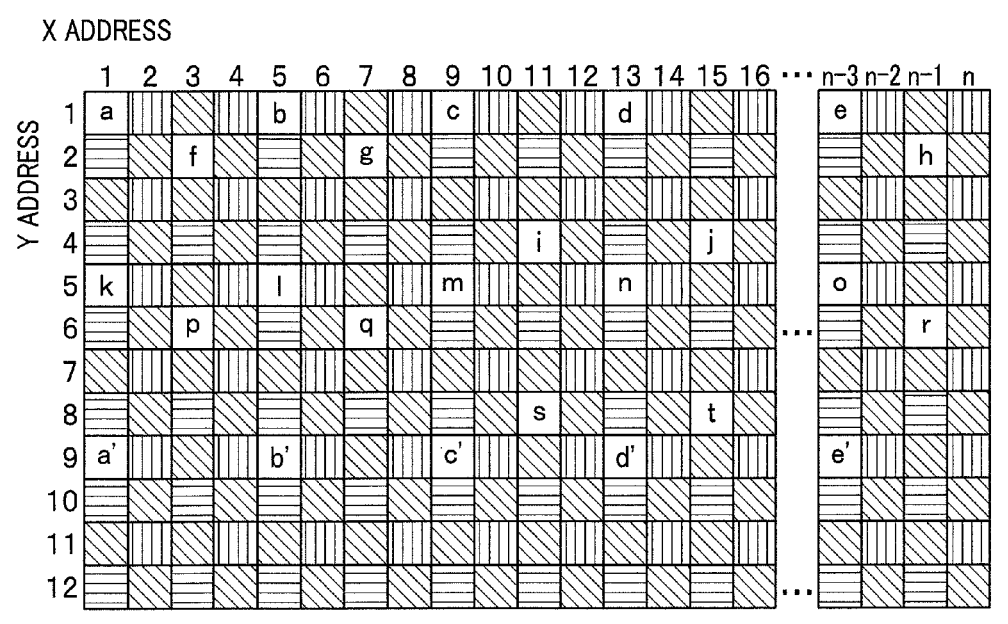

Next, FIG. 6 is a diagram in which identification signs a to t and a' to e' are attached to phase difference pixels in order to explain readout order from the image-signal readout section 28 in the moving image mode.

In FIG. 6, the identification signs a to t and a' to e' are attached to the illustrated phase difference pixels in ascending order of Y addresses and, if the Y addresses are the same, in ascending order of X addresses.

In the pixel arrangement shown in FIG. 6, an example is explained in which an average of pixel signals of 2×2 pixels related to the same color is set as a combined pixel signal (i.e., the pixel signals are thinned out by a quarter). The Gr pixels and the Gb pixels are distinguished as different colors. The phase difference pixels are classified into colors assumed to be conforming to the Bayer array.

In this case, a pixel group of 2×2 pixels of the same color configures unit pixels. Arrangement of the unit pixels in a row direction configures a unit row. Therefore, when k represents, for example, an integer equal to or larger than 0, if the pixel section 24 is the Bayer array, unit rows include a unit row configured by (4k+1)th and (4k+3)th rows and a unit row configured by (4k+2)th and (4k+4)th rows. In the case of the Bayer array, unit pixels of two colors are included in one unit row. For example, a unit row configured by first and third rows includes a unit pixel configured by 2×2 Gr pixels and a unit pixel configured by 2×2 R pixels. A unit row configured by second and fourth rows includes a unit pixel configured by 2×2 Gb pixels and a unit pixel configured by 2×2 B pixels.

In this case, pixel values P'(1, 1) to P'(2, 2) of the basic Bayer array including 2×2 pixels in the combined pixel signals after the combination are calculated by the pixel combining section 32 as indicated by the following Equation 1 on the basis of pixel values P(1, 1) to P(4, 4) in the four unit pixels before the combination.

$$P'(1,1)=\{P(1,1)+P(3,1)+P(1,3)+P(3,3)\}/4$$

$$P'(2,1)=\{P(2,1)+P(4,1)+P(2,3)+P(4,3)\}/4$$

$$P'(1,2)=\{P(1,2)+P(3,2)+P(1,4)+P(3,4)\}/4$$

$$P'(2,2)=\{P(2,2)+P(4,2)+P(2,4)+P(4,4)\}/4 \quad \text{[Equation 1]}$$

Figure 7:
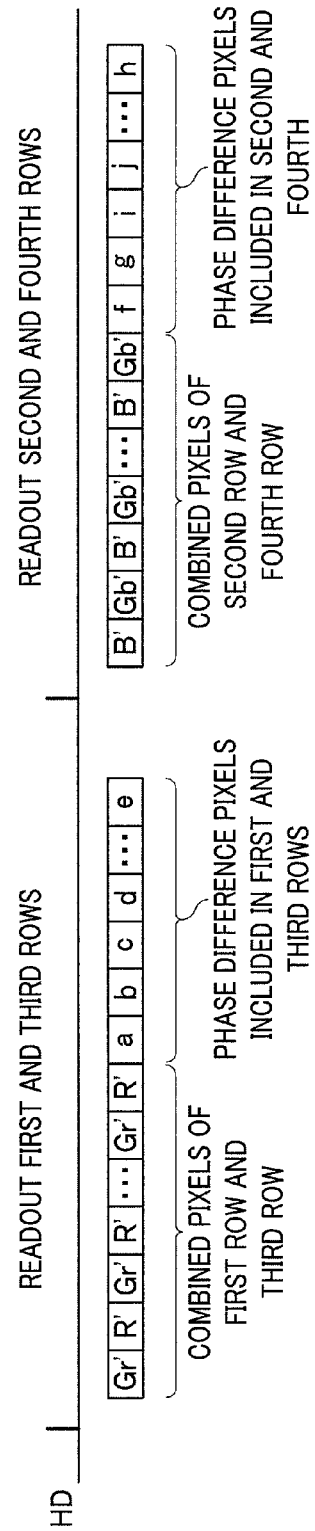
FIG. 7 is a diagram showing readout order of combined pixel signals and phase difference pixel signals generated on the basis of a first unit row including first and third rows and a second unit row including second and forth rows in the first embodiment.

First, FIG. 7 is a diagram showing readout order of combined pixel signals and phase difference pixel signals generated on the basis of a first unit row including first and third rows and a second unit row including second and forth rows.

In readout of pixel signals in one row, first, the image-signal readout section 28 reads out a pixel signal group in which only combined pixel signals generated by the calculation indicated by Equation 1 are arrayed. Subsequently, the image-signal readout section 28 reads out a pixel signal group in which only phase difference pixel signals are arrayed (that is, arranges a combined pixel signal group and a phase difference pixel signal group in series and reads out the combined pixel signal group and the phase difference pixel signal group). However, the phase difference pixel signal group may be read out earlier and the combined pixel signal group may be read out later. Alternatively, as explained above, the phase difference pixel signals and the combined pixel signals may be read out in mixed order and arrayed again.

More specifically, first, a combined pixel signal Gr' obtained by averaging Gr pixel signals in addresses (1, 1), (3, 1), (1, 3), and (3, 3) shown in FIG. 6 is outputted. Subsequently, a combined pixel signal R' obtained by averaging R pixel signals in addresses (2, 1), (4, 1), (2, 3), and (4, 3) is outputted. In this way, all combined pixel signals obtained by combining pixel signals in first row and the third row are read out. Thereafter, subsequently, phase difference pixel signals included in the first row and the third row are read out in order of a, b, c, d, . . . , and e.

Note that, here, when the combined pixel signals are generated, an average is calculated using the signals of the phase difference pixels included in the unit pixel as well. However, since the phase difference pixels have the aperture smaller than the aperture of the image pixels described above, a pixel value of the phase difference pixels is also low. Therefore, it is assumed that a decrease in the average due to the use of the phase difference pixel signals is subjected to the aforementioned pixel value correction processing by the image processing section 15 or the like later (however, for example, if the pixel value correction processing such as gain-up is possible in the image pickup device 13, the pixel value correction processing may be performed in the image pickup device 13 and, more generally, arrangement of a functional unit that performs the pixel value correction processing is not limited).

Pixel signals in positions of the phase difference pixels may be calculated from image pixel signals in the vicinity by interpolation processing. An average may be calculated using the pixel signals obtained by the interpolation processing.

After the readout related to the first unit row is performed, subsequently, readout related to the second unit row is performed in the same manner. First, combined pixel signals B', Gb', and so on are read out. Thereafter, phase difference pixel signals are read out in order of f, g, i, j, . . . , and h. Readout order of the phase difference pixel signals from the unit row is, for example, ascending order of X addresses and, when the X addresses are the same, ascending order of Y addresses. In this way, output pixels for one row are outputted from one unit row in synchronization with a horizontal synchronization signal HD.

Figure 8:
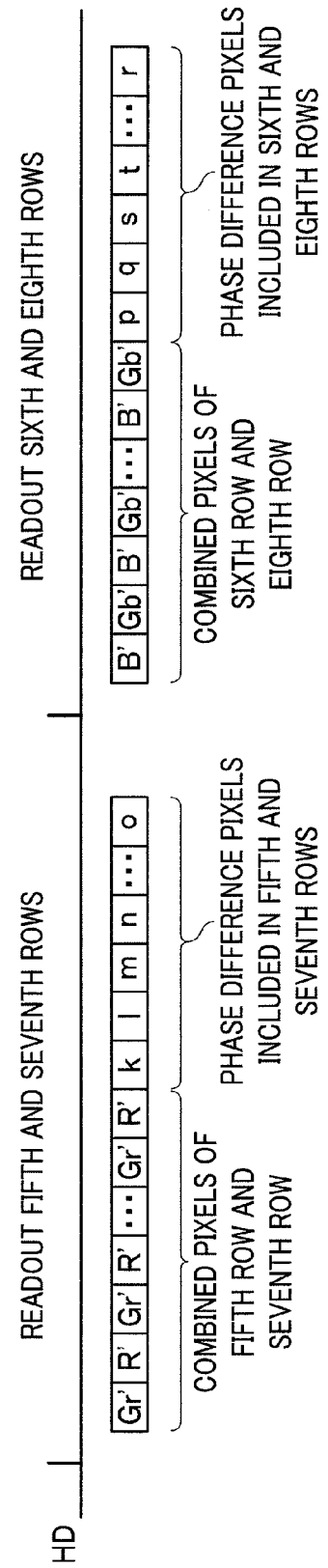
FIG. 8 is a diagram showing readout order of combined pixel signals and phase difference pixel signals generated on the basis of a third unit row including fifth and seventh rows and a fourth unit row including sixth and eighth rows in the first embodiment.

When the readout of the first and second unit rows is performed in this way, subsequently, readout of third and fourth unit rows is performed. FIG. 8 is a diagram showing readout order of combined pixel signals and phase difference pixel signals generated on the basis of a third unit row including fifth and seventh rows and a fourth unit row including sixth and eighth rows.

Concerning the third and fourth unit rows, as in the first and second unit rows described above, first, combined pixel signals and phase difference pixel signals related to the third unit row including the fifth and seventh rows are read out in series. Subsequently, combined pixel signals and phase difference pixel signals related to the fourth unit rows including the sixth and eighth rows are read out in series.

Figure 9:
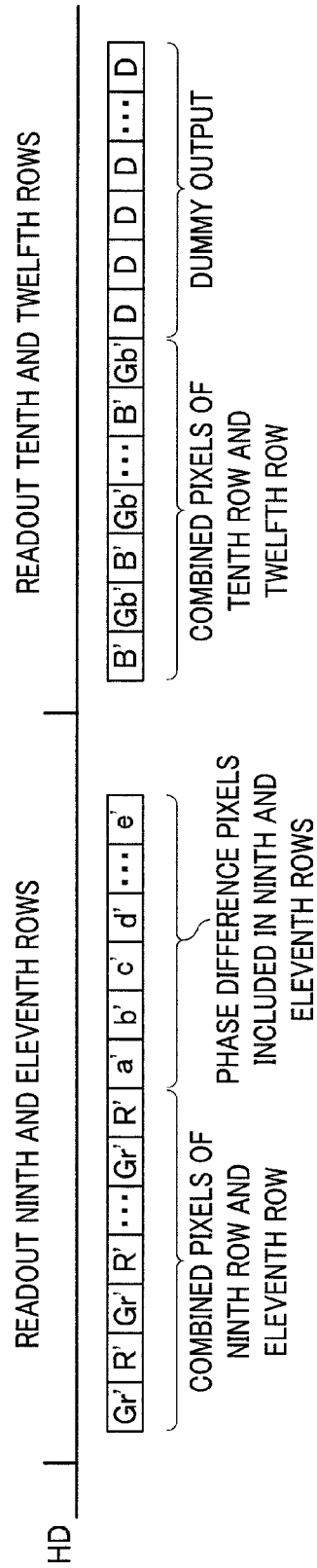
FIG. 9 is a diagram showing readout order of combined pixel signals and phase difference pixel signals generated on the basis of a fifth unit row including ninth and eleventh rows and a sixth unit row including tenth and twelfth rows in the first embodiment.

Further, after the readout of the third and fifth unit rows is performed, readout of fifth and sixth unit rows is performed. FIG. 9 is a diagram showing readout order of combined pixel signals and phase difference pixel signals generated on the basis of a fifth unit row including ninth and eleventh rows and a sixth unit row including tenth and twelfth rows.

First, as in the first to fourth unit rows described above, combined pixel signals and phase difference pixel signals related to the fifth unit row including the ninth and eleventh rows are read out in series.

Subsequently, processing related to the sixth unit row including the tenth and twelfth rows is performed. However, since the phase difference pixels are not included in the tenth row and the twelfth row, first, only the combined pixel signals are read out. Thereafter, dummy phase difference pixel signals D are read out in portions read out as the phase difference pixel signals in the readout related to the first to fifth unit rows. Therefore, the image-signal generating section 27 adds the dummy phase difference pixel signals D to rows in which the number of pixel signals is smaller than the same number such that a total number of the number of the combined pixel signals and the number of the phase difference pixel signals in one row is the same in all the rows.

In general, in one output line, the number of the combined pixel signals is fixed. However, the number of the phase difference pixel signals fluctuates according to the number of the phase difference pixels included in one unit row. Therefore, the image-signal generating section 27 performs processing for matching the number of the phase difference pixels in one output line to a maximum number of the phase difference pixels included in one unit row and filling the dummy phase difference pixel signals D in lines in which the number of the phase difference pixels is smaller than the maximum number.

By performing such processing, the number of pixel signals is fixed in all the lines outputted from the image pickup device 13. It is possible to perform the signal processing and the image processing at later stages in synchronization with synchronization signals of a fixed cycle.

The pixel section 24 is configured by two-dimensionally laying the basic pixel arrangement of 16×12 pixels shown in FIG. 5. Therefore, all the pixels are read out by thereafter repeating readout same as the readout of the twelve rows.

FIG. 10 is a diagram showing a pixel configuration obtained by the readout order shown in FIGS. 7 to 9.

As explained above, the dummy phase difference pixel signals D are added according to necessity. Therefore, as shown in FIG. 10, the numbers of pixels in the respective lines outputted from the image pickup device 13 are the same. Further, the numbers of pixels of the combined pixels in the respective lines are also the same. The numbers of the pixels of the phase difference pixels in the respective lines are also the same.

FIG. 11 is a diagram showing a configuration of output pixels from the image pickup device 13 at the time when a unit pixel is configured by the same color pixel group including 3×3 pixels.

In this case, the first, third, and fifth rows shown in FIG. 6 are the first unit row and the second, fourth, and sixth rows shown in FIG. 6 are the second unit row. Combination of the Gr pixels and the R pixels is performed by, for example, averaging same color 3×3 pixels using the pixel signals in the first, third, and fifth rows. Combination of the Gb pixels and the B pixels is performed by, for example, averaging same color 3×3 pixels using the pixel signals in the second, fourth, and sixth rows (that is, thinned out by one ninths).

As explained above, readout order of the phase difference pixel signals is ascending order of X addresses and, when the X addresses are the same, ascending order of Y addresses. Therefore, for example, the phase difference pixel signals outputted after the combined pixel signals generated from the pixel signals in the first, third, and fifth rows are in order of a, k, b, l, c, m, and so on.

Further, in the basic pixel arrangement of 16×12 pixels shown in FIG. 5, the numbers of the phase difference pixels in the three rows to be combined are as described below.

Total of the first, third, and fifth rows: eight
Total of the second, fourth, and sixth rows: six
Total of the seventh, ninth, and eleventh rows: four
Total of the eighth, tenth, and twelfth rows: two
Therefore, the dummy phase difference pixel signals D are added according to the first, third, and fifth rows in which the number of the phase difference pixels is the largest number.

Note that the system control section 22 grasps, on the basis of a pixel configuration of the image pickup device 13 and setting of a thinning-out ratio, positions of the dummy phase difference pixel signals D shown in FIGS. 10 and 11. Therefore, the first focus detecting section of the focus detecting section 16 is capable of performing focus detection using the phase difference pixel signals, which are not dummies, on the basis of the control by the system control section 22.

Figures 12, 13:
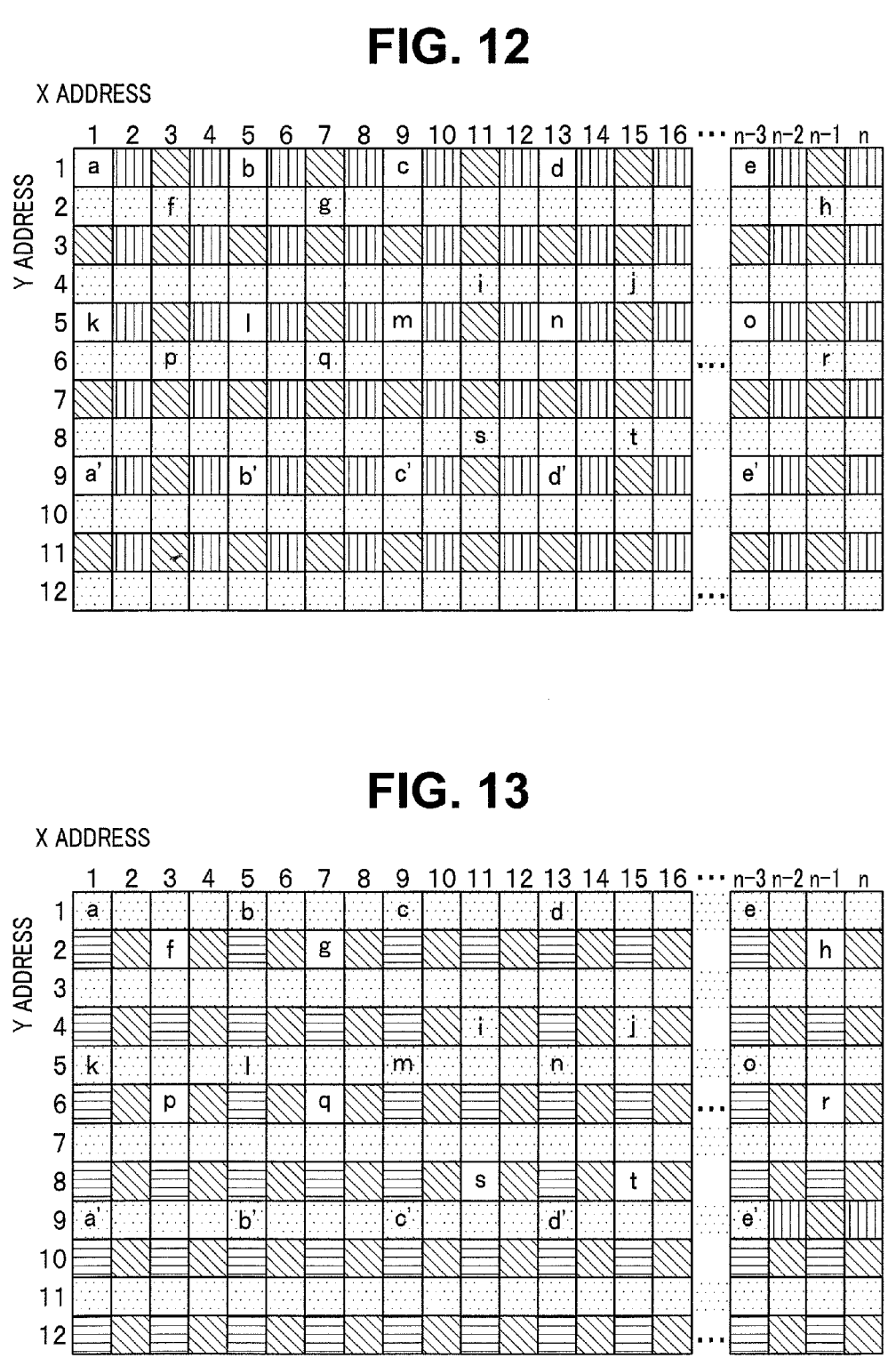

FIG. 12 is a diagram showing arrangement of Gr and R lines in the pixel section 24. FIG. 13 is a diagram showing arrangement of Gb and B lines in the pixel section 24.

The addition thinning-out processing is performed for each of color components. However, in the present embodiment, as explained above, the R pixels, the B pixels, the Gr pixels, and the Gb pixels are colored in the different colors and distinguished. Therefore, combination of the Gr pixels is performed among the Gr pixels shown in FIG. 12. Combination of the Gb pixels is performed among the Gb pixels shown in FIG. 13. Processing for combining the Gr pixels and the Gb pixels is not performed.

Figure 14:
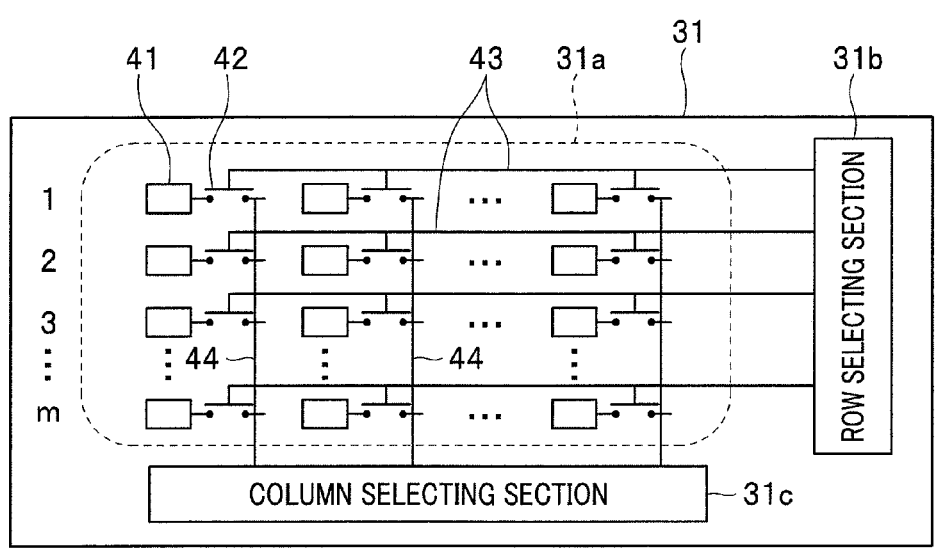
FIG. 14 is a diagram showing a configuration of a memory section in the first embodiment.

FIG. 14 is a diagram showing a configuration of the memory section 31.

The memory section 31 includes a memory array 31a in which a plurality of unit memories 41 are arranged in a matrix shape. The number of the unit memories 41 provided in the memory array 31a is at least equal to or larger than the number of pixels included in the unit row. When a plurality of thinning-out modes are provided, it is necessary to provide, in the memory array 31a, the unit memories 41 by a number equal to or larger than a maximum in a thinning-out mode in which the number of pixels included in the unit row is the maximum.

More specifically, when the number of columns of the unit memories 41 arrayed in the memory array 31a is set the same as the number of columns of the pixels arrayed in the pixel section 24 and when one-ninth thinning-out for averaging 3×3 pixels is the thinning-out mode of the maximum, the number of rows m of the memory array 31a needs to be three or more. Further, when pixel signals are read out in line order from the pixel section 24, if it is taken into account that Gr, R lines and Gb and B lines are alternately arranged, the number of rows m of the memory array 31a is desirably six or more.

Readout switches 42 are provided to respectively correspond to the unit memories 41. One ends of the readout switches 42 are connected to the unit memories 41 and the other ends of the readout switches 42 are connected to column signal lines 44. ON/OFF of the readout switches 42 is controlled by a row selecting section 31b via row signal lines 43. All the row signal lines 43 are connected to the row selecting section 31b. All the column signal lines 44 are connected to a column selecting section 31c.

In such a configuration, the row selecting section 31b selects a certain row signal line 43 and turns on the readout switch 42 of the selected row. The column selecting section 31c selects a certain column signal line 44. Consequently, it is possible to select and read out a pixel signal stored in the unit memory 41 to which both the certain row signal line 43 and the certain column signal line 44 are connected.

In this way, the image-signal generating section 27 selects a necessary unit memory 41, reads out pixel signals stored in the selected unit memory 41, and performs averaging processing, rearrangement processing, and the like.

Figure 15:
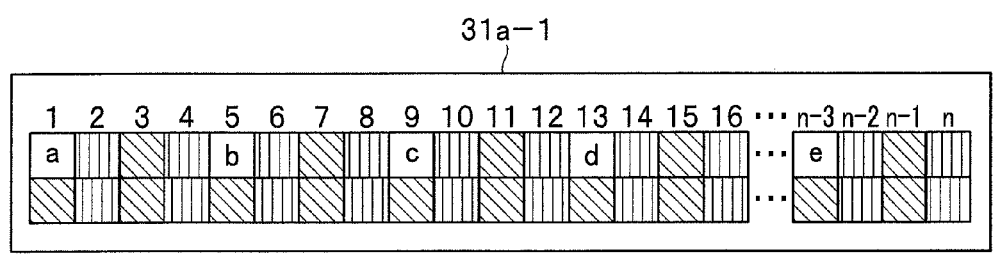
FIG. 15 is a diagram showing the Gr and R lines stored in a first memory array by quarter thinning-out in the first embodiment.
Figure 16:
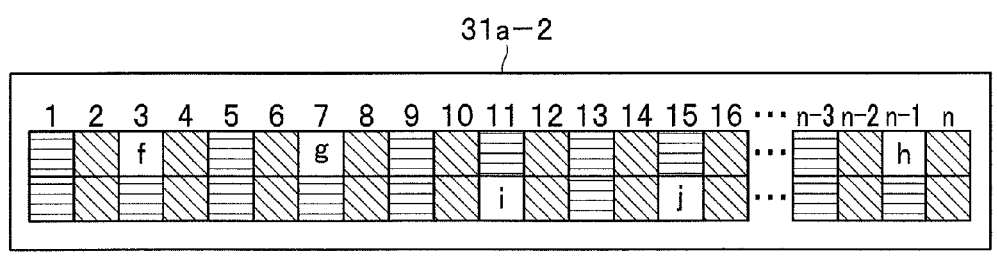
FIG. 16 is a diagram showing the Gb and B lines stored in a second memory array by the quarter thinning-out in the first embodiment.

FIG. 15 is a diagram showing the Gr and R lines stored in a first memory array 31a-1 by quarter thinning-out. FIG. 16 is a diagram showing the Gb and B lines stored in a second memory array 31a-2 by the quarter thinning-out.

The thinning-out processing by the averaging is applied to same color pixels. Therefore, when the image pickup device 13 includes a color filter of the Bayer array, odd number rows and even number rows may be stored in different regions of the memory section 31a.

That is, as shown in FIGS. 15 and 16, the memory section 31a may be divided into a plurality of memory regions of the first memory array 31a-1 and the second memory array 31a-2. For example, respective pixel signals of the Gr and R lines may be stored in the first memory array 31a-1 and, for example, respective pixel signals of the Gb and B lines may be stored in the second memory array 31a-2.

In this case, in the first memory array 31a-1 and the second memory array 31a-2, first, pixel signals in the first and third rows and the second and fourth rows are respectively stored, subsequently, pixel signals in the fifth and seventh rows and the sixth and eighth rows are respectively stored, and pixel signals in the ninth and eleventh rows and the tenth and twelfth rows are further respectively stored in sequence.

Figure 17:
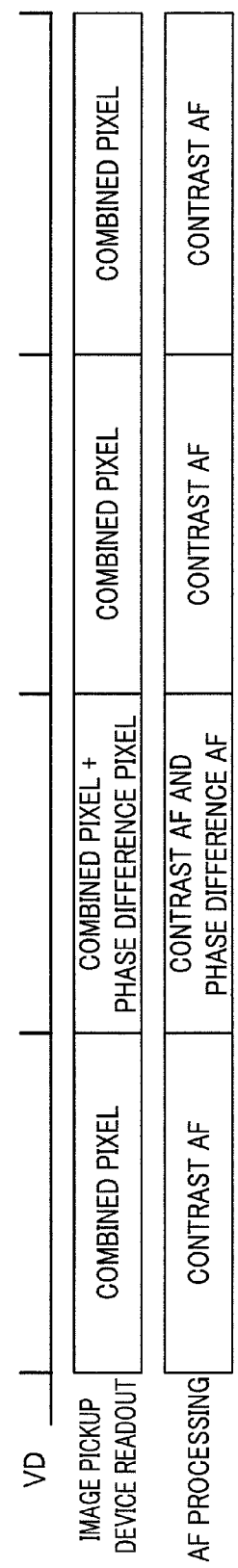
FIG. 17 is a timing chart showing a state in which phase difference AF is performed at a ratio of one frame in a plurality of frames in the moving image mode in the first embodiment.
Figure 18:
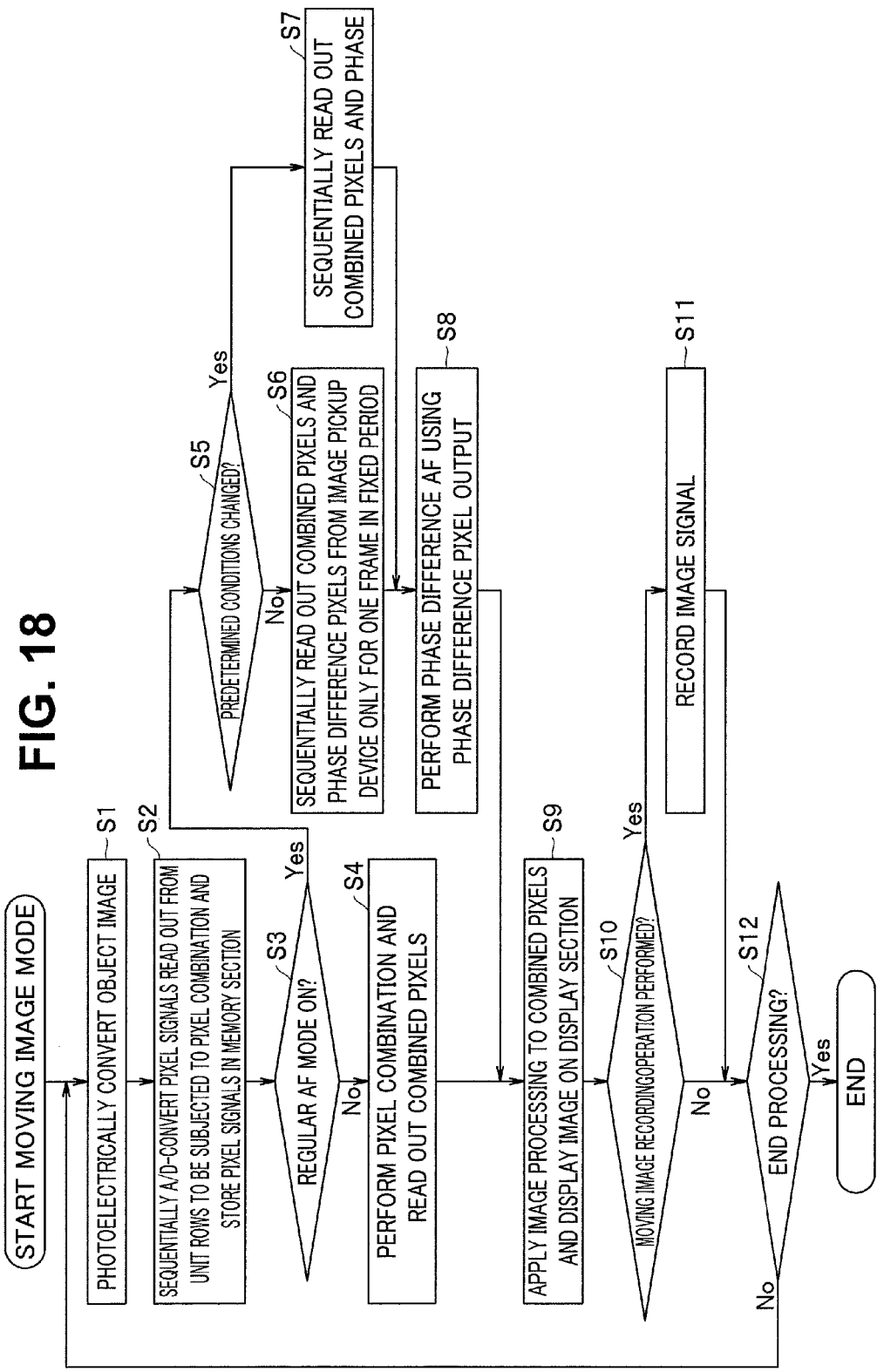
FIG. 18 is a flowchart showing processing in the moving image mode in the first embodiment.

FIG. 17 is a timing chart showing a state in which phase difference AF is performed at a ratio of one frame in a plurality of frames in the moving image mode. FIG. 18 is a flowchart for explaining processing in the moving image mode.

When the processing shown in FIG. 18 is started, the pixel section 24 photoelectrically converts an object image (step S1).

When the photoelectric conversion ends, the vertical scanning section 23 selects and scans a row to be set as a readout target from the pixel section 24 (including a unit row to be set as a target of combination processing) according to a set row thinning-out ratio. Pixel signals read out in row units from the pixel section 24 in this way are processed by the analog processing section 25 and then A/D-converted by the ADC section 26 and stored in the memory section 31 (step S2).

Subsequently, the system control section 22 determines whether a regular AF mode (a continuous AF mode) is set (step S3).

When it is determined that the regular AF mode is not set, the pixel combining section 32 selects, from the pixel signals stored in the memory section 31, pixel signals included in a unit pixel corresponding to a set matrix thinning-out ratio (as explained above, pixel signals of the same color), reads out the selected pixel signals, subjects the pixel signals to the combination processing, and generates combined pixel signals. The image pickup device 13 reads out, on the basis of the control by the system control section 22, only the combined pixel signals subjected to the combination processing (step S4).

When it is determined in step S3 that the regular AF mode is set, the system control section 22 determines whether predetermined conditions change (step S5). The predetermined conditions include at least one of an object condition and a photographing condition.

As an example in which it is determined that the object condition changes, a case is given in which at least one of luminance and color information of an AF target region (a setting region, a face region, a screen center region, etc.) changes by a value equal to or larger than respective predetermined value corresponding to the luminance or the color information.

As an example in which it is determined that the photographing condition changes, a case is given in which at least one of sensitivity setting, shutter speed setting, diaphragm setting, and focal length setting changes by a value equal to or larger than a predetermined value corresponding to each setting or an output value of a gyro sensor for detecting a camera shake and a posture of the image pickup device changes by a value equal to or larger than a predetermined value.

When it is determined in step S5 that the predetermined conditions do not change, as shown in FIG. 17, the system control section 22 perform processing during continuous AF for sequentially reading out, from the image pickup device 13, the combined pixel signals and the phase difference pixel signals at a ratio of one frame in a plurality of frames and reading out only the combined pixel signals from the image pickup device 13 in the other frames (step S6). When the phase difference pixel signals are read out, the phase-difference-pixel extracting section 33 selects and reads out, from the pixel signals stored in the memory section 31, only the phase difference pixel signals included in a unit row corresponding to the set matrix thinning-out ratio.

When it is determined in step S5 that the predetermined conditions change, the system control section 22 sequentially reads out the combined pixel signals and the phase different pixel signals from the image pickup device 13 immediately at timing when it is determined that the predetermined conditions change (step S7).

When the processing of the frame for reading out the phase difference pixel signals as well is performed in step S6 or when the processing in step S7 is performed, the horizontal scanning section 34 horizontally scans and outputs, in order of column numbers, the combined pixel signals generated by the pixel combining section 32 and thereafter continuously sequentially horizontally scans and outputs the phase difference pixel signals extracted by the phase-difference-pixel extracting section 33 (see FIGS. 7 to 9).

In this way, when the phase difference pixel signals are read out in step S6 or S7, the first focus detecting section of the focus detecting section 16 performs focus detection based on the phase difference method on the basis of the read-out phase difference pixel signals (step S8).

In this way, the system control section 22 determines whether at least one of the object condition and the photographing condition changes and, when determining that at least one of the object condition and the photographing condition changes, causes the image-signal readout section 28 to read out the phase difference pixel signals and further controls the first focus detecting section to perform the focus detection.

When the first focus detecting section does not perform the focus detection (see FIG. 17), the system control section 22 controls the image-signal readout section 28 of the image pickup device 13 not to output the phase difference pixel signals.

After performing step S4 or step S8, the system control section 22 applies, with the image processing section 15, the image processing to the read-out combined pixel signals and displays an image after the processing on the display section 18 (step S9).

Thereafter, the system control section 22 determines whether operation of moving image recording is performed (step S10). When the operation is performed, the system control section 22 records an obtained movie signal for one frame in the recording section 17 (step S11).

When the processing in step S11 ends or when it is determined in step S10 that the operation of the moving image recording is not performed (e.g., in the case of a live view), the system control section 22 determines whether the processing in the moving image mode is ended (step S12). When the processing of the moving image mode is not ended, the system control section 22 returns to the aforementioned step S1 and repeatedly performs the operation of the steps concerning the next frame. When the processing of the moving image mode is ended, the system control section 22 ends the processing.

Note that, in the above explanation, the combined pixel signals and the phase difference pixel signals are generated from the pixel signals converted into the digital pixel signals by the ADC section 26. However, the combined pixel signals and the phase difference pixel signals may be generated from the analog pixel signals processed by the analog processing section 25.

In FIG. 2, as an output system from the pixel section 24, only one output system from the analog processing section 25 to the image-signal readout section 28 is provided (for example, on a lower side of the pixel section 24). However, a plurality of output systems may be provided, for example, two output systems may be provided in total by providing one more output system on an upper side of the pixel section 24 to simultaneously subject signals of the pixel section 24 to parallel processing in the two output systems. More specifically, in this case, for example, the first memory section including the first memory array 31a-1 shown in FIG. 15 is arranged in one output system to store the pixel signals in the Gr and R lines and the second memory section including the second memory array 31a-2 shown in FIG. 16 is arranged in the other system to store the pixel signals in the Gb and B lines. It is possible to apply the present invention to the image pickup device 13, for which an increase in speed is attained, in the same manner as explained above.

According to the first embodiment, both the combined pixel signals obtained by combining the image pixels and the phase difference pixel signals are included in the signal output of one row from the image pickup device 13. Therefore, it is possible to acquire the combined pixel signals used for image display even in a frame in which readout of the phase difference pixel signals is performed. It is possible to perform smooth moving image display without a lack of a frame.

Further, the pixel signal group in which only the combined pixel signals are arrayed and the pixel signal group in which only the phase difference pixel signals are arrayed are arranged in series and read out as one signal. Therefore, it is possible to easily separate the combined pixel signals and the phase difference pixel signals.

The dummy pixel signals are added to the rows in which the number of pixel signals is smaller than the same number such that the total number of the number of the combined pixel signals and the number of the phase difference pixel signals in one row is the same in all the rows. Therefore, it is possible to perform the image processing and the like that synchronize with the synchronization signal at the fixed cycle.

When the pixel signals are converted into digital signals and then the combined pixel signals are generated, it is possible to easily perform the combination processing. On the other hand, when the analog pixel signals are subjected to the combination processing as they are, it is unnecessary to perform, in the image pickup device 13, the A/D conversion that requires long time for the processing. Therefore, it is possible to increase speed of readout of the pixel signals from the image pickup device 13.

In addition, by generating image signals for a moving image on the basis of the combined pixel signals, it is possible to reduce the number of readout pixels from the image pickup device 13. It is possible to secure a necessary frame rate and perform smooth movie display.

The first focus detecting section performs the phase difference AF on the basis of the phase difference pixel signals. The second focus detecting section performs the contrast AF on the basis of the combined pixel signals. Therefore, it is possible to make use of characteristics of both the AF systems. More specifically, for example, quicker AF processing is performed by the phase difference AF that can perform AF from only an image of one frame. Thereafter, highly accurate AF processing is performed using the contrast AF.

Further, when the first focus detecting section does not perform the focus detection, the image-signal readout section 28 of the image pickup device 13 is prevented from outputting the phase difference pixel signals. Therefore, it is possible to reduce the number of pixels to be processed in the image pickup device 13 to attain power saving and an increase in speed.

When at least one of the object condition and the photographing condition changes, the phase difference pixel signals are read out and the phase difference AF is performed. Therefore, it is possible to cope with the change in the condition in a short time and reduce an AF time lag.

[Second Embodiment]

Figure 19:
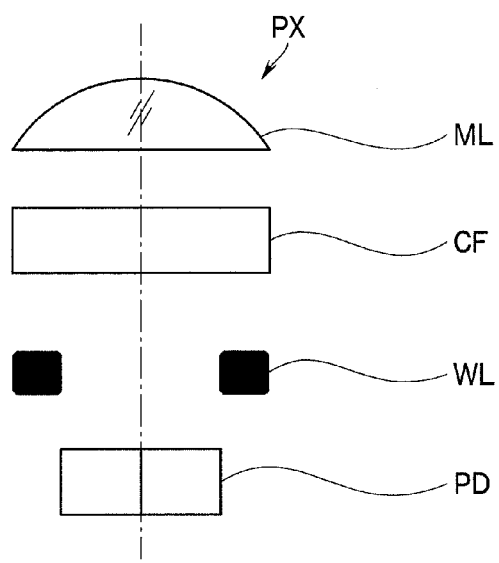
FIG. 19 is a diagram showing a configuration of a phase difference pixel along a ray direction in a second embodiment of the present invention.
Figure 20:
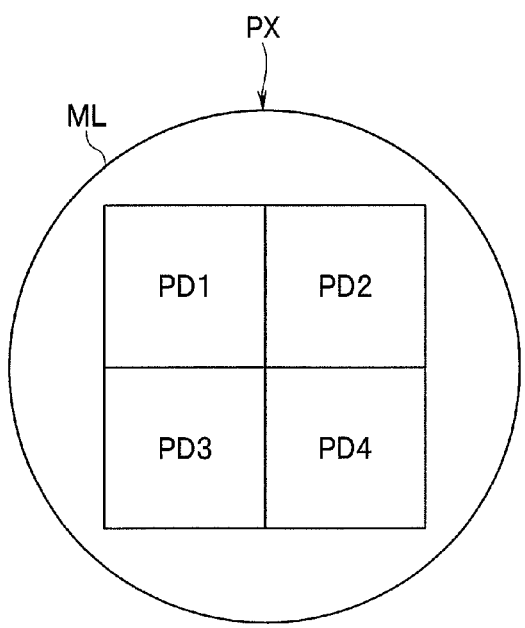
FIG. 20 is a plan view showing a configuration of the phase difference pixel in the second embodiment.

FIGS. 19 to 24 show a second embodiment of the present invention. FIG. 19 is a diagram showing a configuration of a phase difference pixel along a ray direction. FIG. 20 is a plan view showing a configuration of the phase difference pixel.

In the second embodiment, portions same as the portions in the first embodiment described above are denoted by the same reference numerals and signs. Explanation of the portions is omitted as appropriate. Mainly, only differences from the first embodiment are explained.

In the first embodiment described above, one phase difference pixel is any one of the right aperture pixel Ri, the left aperture pixel Le, the upper aperture pixel To, and the lower aperture pixel Bo. However, in the present embodiment, one phase difference pixel can function as all of the right aperture pixel Ri, the left aperture pixel Le, the upper aperture pixel To, and the lower aperture pixel Bo.

That is, the photodiode PD arranged with respect to one pixel PX including one micro lens ML as shown in FIG. 19 is configured by four photodiodes PD1 to PD4 as shown in FIG. 20. The photodiodes PD1 to PD4 are arrayed in 2×2. Therefore, in the following explanation, each of the photodiodes PD1 to PD4 is referred to as sub-pixel or the like as appropriate. Limitation of an aperture by the wiring layer WL is not performed for the pixel PX in the present embodiment. Rays from an object are made incident on all the photodiodes PD1 to PD4 and respectively photoelectrically converted. Further, it is possible to respectively independently read out sub-pixel signals accumulated in the respective photodiodes PD1 to PD4.

Note that the pixel configurations shown in FIGS. 19 and 20 are not limited to the phase difference pixel and are the same concerning an image pixel.

When pixel signals are read out, a phase difference pixel signal of the left aperture pixel Le can be obtained by adding up and reading out the sub-pixel signal of the photodiode PD1 and the sub-pixel signal of the photodiode PD3. Similarly, a phase difference pixel signal of the right aperture pixel Ri can be obtained by adding up and reading out the sub-pixel signals of the photodiodes PD2 and PD4. A phase difference pixel signal of the upper aperture pixel To can be obtained by adding up and reading out the sub-pixel signals of the photodiodes PD1 and PD2. A phase difference pixel signal of the lower aperture pixel Bo can be obtained by adding up and reading out the sub-pixel signals of the photodiodes PD3 and PD4.

The addition of the sub-pixel signals is performed in each of the respective rows by, for example, the pixel combining section 32 and the phase-difference-pixel extracting section 33. Therefore, the vertical scanning section 23 can select and scan a line in sub-pixel units (referred to as sub-line as appropriate). The analog processing section 25, the ADC section 26, and the memory section 31 are configured to be capable of handling the sub-pixel signals.

Figure 21:
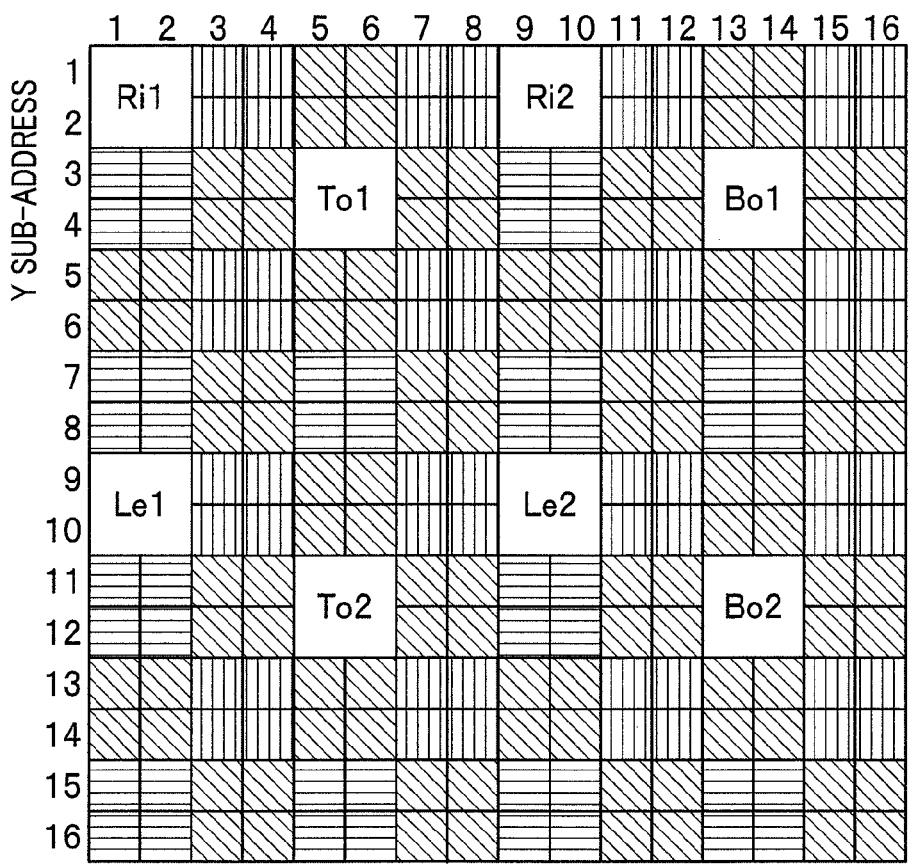
FIG. 21 is a diagram showing basic pixel arrangement in a pixel section in the second embodiment.

FIG. 21 is a diagram showing basic pixel arrangement in the pixel section 24. Note that, in FIG. 21 and FIG. 23 referred to below, an X sub-address and a Y sub-address are described as addresses in sub-pixel units.

The pixel section 24 is configured by two-dimensionally laying the basic pixel arrangement of 8 pixels in a horizontal direction (X sub-addresses 1 to 16)×8 pixels in a vertical direction (Y sub-addresses 1 to 16) shown in FIG. 21. It is possible to perform readout from the pixel section 24 in sub-pixel units by selecting an X sub-address and a Y sub-address.

First, except that 2×2 XY sub-addresses are set as units of one color, image pixels are arrayed in the primary color Bayer array as in the first embodiment described above.

Positions where a two-dimensional sub-address (X, Y) is addresses described below are respectively used as the right aperture pixel Ri, the left aperture pixel Le, the upper aperture pixel To, and the lower aperture pixel Bo, for example.

Ri: (1 to 2, 1 to 2), (9 to 10, 1 to 2)
Le: (1 to 2, 9 to 10), (9 to 10, 9 to 10)
To: (5 to 6, 3 to 4), (5 to 6, 11 to 12)
Bo: (13 to 14, 3 to 4), (13 to 14, 11 to 12)

In such pixel arrangement, the first focus detecting section of the focus detecting section 16 detects phase difference information of a vertical line component of the object on the basis of pixel signals obtained from a group of the right aperture pixels Ri (e.g., a group in which the Y sub-address is 1 to 2) and pixel signals obtained from a group of the left aperture pixels Le (e.g., a group in which the Y sub-address is 9 to 10) and detects phase difference information of a horizontal line component of the object on the basis of pixel signals obtained from a group of the upper aperture pixels To (e.g., a group in which the X sub-address is 5 to 6) and pixel signals obtained from a group of the lower aperture pixels Bo (e.g., a group in which the X sub-address is 13 to 14).

Further, in the present embodiment, on the respective phase difference pixels, color filters conforming to the Bayer array are arranged. That is, the color filters CF of green (G) are arranged on the right aperture pixels Ri and the left aperture pixels Le and the color filters CF of blue (B) are arranged on the upper aperture pixels To and the lower aperture pixels Bo.

Therefore, if nondestructive readout is performed, the right aperture pixels Ri and the left aperture pixels Le can also function as Gr pixels and the upper aperture pixels To and the lower aperture pixels Bo can also function as B pixels.

When the color filters corresponding to the Bayer array are also provided in the phase difference pixels in this way, the phase difference pixels can also function as image pixels. If all the sub-pixels can be read out as desired, it is possible to attain not only the phase difference pixel arrangement shown in FIG. 21 but also desired phase difference pixel arrangement without changing hardware.

Generation of a combined pixel value P'(1, 1) by quarter thinning-out in the pixel arrangement shown in FIG. 21 is calculated as indicated by the following Equation 2 by the pixel combining section 32 on the basis of sub-pixel values P described below before combination for configuring a unit pixel.

$$P'(1,1) = [\{P(1,1)+P(2,1)+P(1,2)+P(2,2)\}+\{P(5,1)+P(6,1)+P(5,2)+P(6,2)\}+\{P(1,5)+P(2,5)+P(1,6)+P(2,6)\}+\{P(5,5)+P(6,5)+P(5,6)+P(6,6)\}]/4 \quad \text{[Equation 2]}$$

Figure 22:
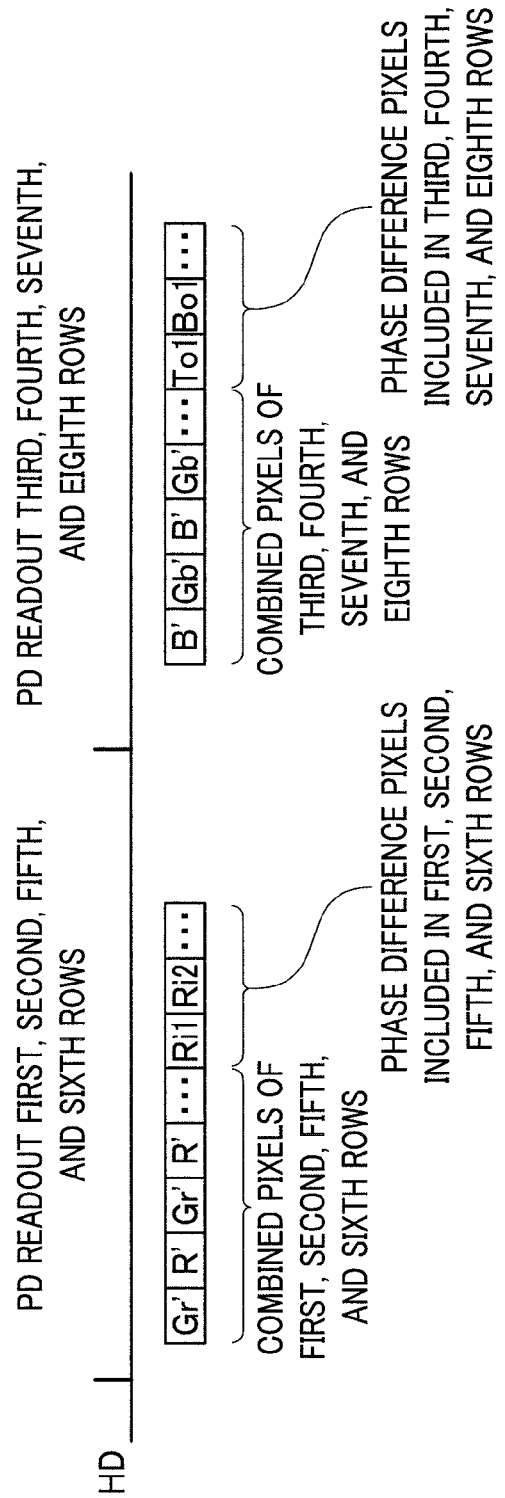
FIG. 22 is a diagram showing readout order of combined pixel signals and phase difference pixel signals generated on the basis of a first unit row including first and second and fifth and sixth sub-lines and a second unit row including third and fourth and seventh and eighth sub-lines in a configuration shown in FIG. 21 in the second embodiment.

FIG. 22 is a diagram showing readout order of combined pixel signals and phase difference pixel signals generated on the basis of a first unit row including first and second and fifth and sixth sub-lines and a second unit row including third and fourth and seventh and eighth sub-lines in a configuration shown in FIG. 21.

In readout of pixel signals in one row, first, the image-signal readout section 28 reads out a pixel signal group in which only combined pixel signals generated by, for example, the calculation indicated by Equation 2 are arrayed. Subsequently, the image-signal readout section 28 reads out a pixel signal group in which only phase difference pixel signals are arrayed (that is, arranges a combined pixel signal group and a phase difference pixel signal group in series and reads out the combined pixel signal group and the phase difference pixel signal group as in the first embodiment described above).

As a result, the combined pixel signals are read out in order of Gr', R', Gr', R', and so on. Thereafter, subsequently, the phase difference pixel signals are read out in order of Ri1, Ri2, and so on. When the readout of the sub-pixels of the first and second and fifth and sixth sub-lines ends, subsequently, readout of sub-pixels of the third and fourth and seventh and eight sub-lines is performed and the combined pixel signals are read out in order of B', Gb', B', Gb', and so on. Thereafter, subsequently, the phase difference pixel signals are read out in order of To1, Bo2, and so on.

Note that, in the present embodiment, when the combined pixel signals are generated to include the phase difference pixels, all the sub-pixel signals included in the phase difference pixels are used. Therefore, the pixel value correction processing by the image processing section 15 or the like in the first embodiment described above is unnecessary.

Figure 23:
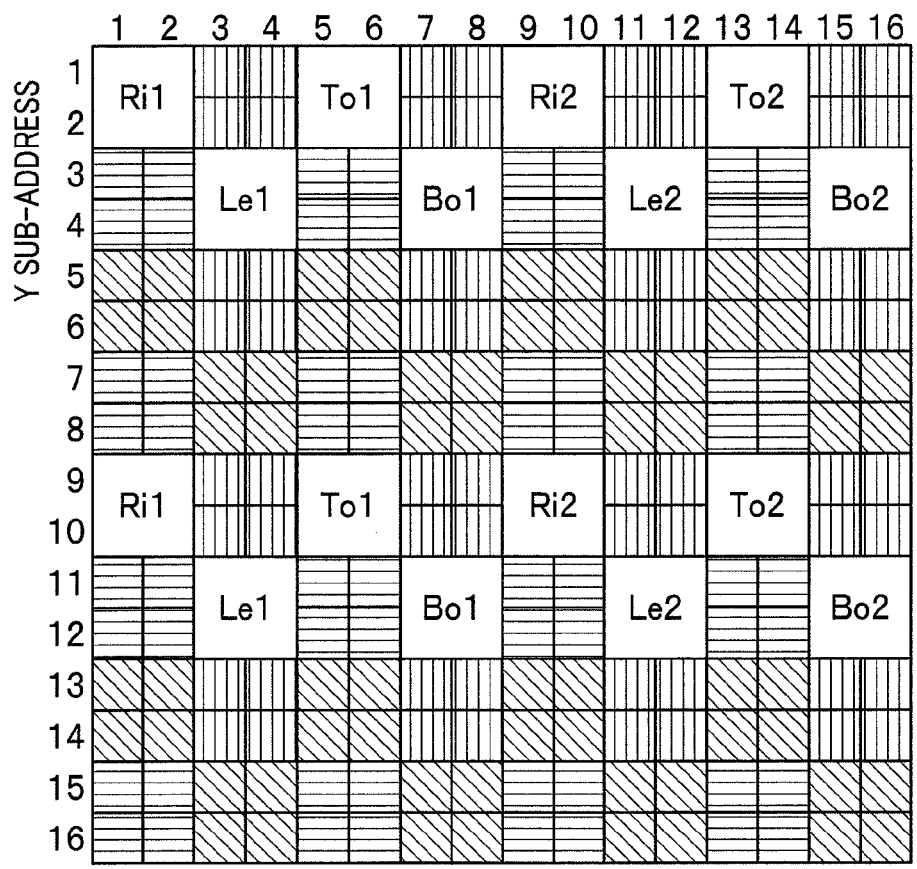
FIG. 23 is a diagram showing another example of the basic pixel arrangement in the pixel section in the second embodiment.

FIG. 23 is a diagram showing another example of the basic pixel arrangement in the pixel section 24.

As in the example shown in FIG. 21, the basic pixel arrangement in the pixel section 24 is 8 pixels in a horizontal direction (X sub-addresses 1 to 16)×8 pixels in a vertical direction (Y sub-addresses 1 to 16).

In an image pixel group arrayed in the primary color Bayer array with 2×2 XY sub-addresses set as units of one color, positions where a two-dimensional sub-address (X, Y) is addresses described below are respectively used as the right aperture pixel Ri, the left aperture pixel Le, the upper aperture pixel To, and the lower aperture pixel Bo, for example.

Ri: (1 to 2, 1 to 2), (9 to 10, 1 to 2)
(1 to 2, 9 to 10), (9 to 10, 9 to 10)
Le: (3 to 4, 3 to 4), (11 to 12, 3 to 4)
(3 to 4, 11 to 12), (11 to 12, 11 to 12)
To: (5 to 6, 1 to 2), (13 to 14, 1 to 2)
(5 to 6, 9 to 10), (13 to 14, 9 to 10)
Bo: (7 to 8, 3 to 4), (15 to 16, 3 to 4)
(7 to 8, 11 to 12), (15 to 16, 11 to 12)

In such pixel arrangement, the first focus detecting section of the focus detecting section 16 detects phase difference information of a vertical line component of the object on the basis of pixel signals obtained from a group of the right aperture pixels Ri (e.g., a group in which the Y sub-address is 1 to 2) and pixel signals obtained from a group of the left aperture pixels Le (e.g., a group in which the Y sub-address is 3 to 4) and detects phase difference information of a horizontal line component of the object on the basis of pixel signals obtained from a group of the upper aperture pixels To (e.g., a group in which the X sub-address is 5 to 6) and pixel signals obtained from a group of the lower aperture pixels Bo (e.g., a group in which the X sub-address is 7 to 8).

In the arrangement shown in FIG. 23, the right aperture pixels Ri and the left aperture pixels Le are arranged in adjacent pixel positions and the upper aperture pixels To and the lower aperture pixels Bo are arranged in adjacent pixel positions to improve phase difference detection accuracy.

The arrangement is the same as the example shown in FIG. 21 in that the color filters conforming to the Bayer array are arranged on the respective phase difference pixels, that is, the color filters CF of green (G) (more specifically, Gr or Gb) are arranged on the respective phase difference pixels Ri, Le, To, and Bo. Therefore, the arrangement is also the same as the example shown in FIG. 21 in that the phase difference pixels also function as the image pixels and the pixel value correction processing by the image processing section 15 or the like is unnecessary.

Figure 24:
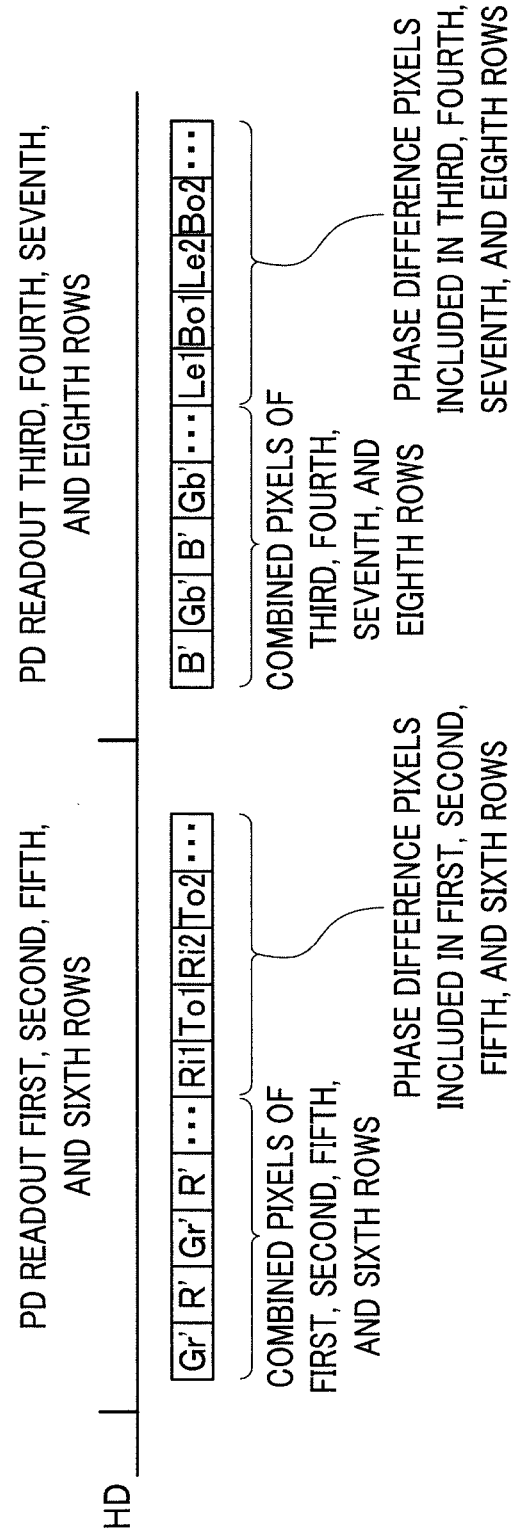
FIG. 24 is a diagram showing readout order of combined pixel signals and phase difference pixel signals generated on the basis of a first unit row including first and second and fifth and sixth sub-lines and a second unit row including third and fourth and seventh and eighth sub-lines in a configuration shown in FIG. 23 in the second embodiment.

FIG. 24 is a diagram showing readout order of combined pixel signals and phase difference pixel signals generated on the basis of a first unit row including first and second and fifth and sixth sub-lines and a second unit row including third and fourth and seventh and eighth sub-lines in the configuration shown in FIG. 23.

In readout of pixel signals in one row, first, the image-signal readout section 28 reads out a pixel signal group in which only combined pixel signals generated by, for example, the calculation indicated by Equation 2 are arrayed. Subsequently, the image-signal readout section 28 reads out a pixel signal group in which only phase difference pixel signals are arrayed (that is, arranges a combined pixel signal group and a phase difference pixel signal group in series and reads out the combined pixel signal group and the phase difference pixel signal group as in the first embodiment described above).

As a result, the combined pixel signals are read out in order of Gr', R', Gr', R', and so on. Thereafter, subsequently, the phase difference pixel signals are read out in order of Ri1, To1, Ri2, To2, and so on. When the readout of the sub-pixels of the first and second and fifth and sixth sub-lines ends, subsequently, readout of sub-pixels of the third and fourth and seventh and eight sub-lines is performed and the combined pixel signals are read out in order of B', Gb', B', Gb', and so on. Thereafter, subsequently, the phase difference pixel signals are read out in order of Le1, Bo1, Le2, Bo2, and so on.

According to the second embodiment, effects substantially the same as the effects in the first embodiment described above are attained. Further, since the phase difference pixels also function as the image pixels, it is possible to obtain movies and still pictures for which interpolation is unnecessary.

Further, simply by changing a way of reading out sub-pixels, it is possible to use the phase difference pixels as all of the right aperture pixels Ri, the left aperture pixels Le, the upper aperture pixels To, and the lower aperture pixels Bo.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:
1. An image pickup device comprising:
a pixel section in which pixels for generating pixel signals for an image and pixels for generating pixel signals for focus detection are arranged in a matrix shape, the pixel section outputting the generated pixel signals;
an image-signal generating section including a storing section that stores, when a plurality of pixels arranged in the matrix shape in the pixel section are divided into unit pixels configured by a plurality of pixels adjacent to one another, each of the unit pixels including at least one image pixel for generating a pixel signal for an image, the pixel signals outputted from the pixel section for at least one row of unit rows configured by arrangement of the unit pixels in a row direction, the image-signal generating section generating, on the basis of the pixel signals stored in the storing section, for each of the unit rows, combined pixel signals obtained by combining the pixel signals related to the unit pixels and phase difference pixel signals for the focus detection extracted from each of the unit rows; and an image-signal readout section that reads out, as signals of one row, the combined pixel signals and the phase difference pixel signals related to one unit row generated by the image-signal generating section.

2. The image pickup device according to claim 1, wherein the image-signal readout section arranges, in series, for each of the unit rows, a pixel signal group in which only the combined pixel signals are arrayed and a pixel signal group in which only the phase difference pixel signals are arrayed and reads out the pixel signal groups as signals of one row.

3. The image pickup device according to claim 1, wherein the image-signal generating section adds dummy pixel signals to a row in which a number of pixel signals is smaller than a same number such that a total number of a number of the combined pixel signals and a number of the phase difference pixel signals in one row is the same in all rows.

4. The image pickup device according to claim 1, further comprising an A/D conversion section that A/D-converts the pixel signals outputted from the pixel section and outputs digital pixel signals, wherein the storing section stores the digital pixel signals A/D-converted by the A/D conversion section, the image-signal generating section generates the combined pixel signals of a digital form and the phase difference pixel signal of a digital form on the basis of the digital pixel signals stored in the storing section, and the image-signal readout section reads out, as the signals of one row, the digital combined pixel signals and the digital phase difference pixel signals related to one unit row.

5. An image pickup apparatus comprising:
the image pickup device according to claim 1;
an image processing section that subjects the combined pixel signals read out from the image pickup device to image processing and generates image signals for a moving image or a still image;
a first focus detecting section that performs, on the basis of the phase difference pixel signals read out from the image pickup device, focus detection based on a phase difference method; and
a second focus detecting section that performs, on the basis of the combined pixel signals read out from the image pickup device, focus detection based on a contrast method.

6. The image pickup apparatus according to claim 5, further comprising a control section that controls, when the first focus detecting section does not perform the focus detection, the image-signal readout section not to output the phase difference pixel signals.

7. The image pickup apparatus according to claim 6, wherein the control section determines whether at least one of an object condition and a photographing condition changes and, when determining that at least one of the object condition and the photographing condition changes, causes the image-signal readout section to read out the phase difference pixel signals and further controls the first focus detecting section to perform the focus detection.

8. The image pickup device according to claim 1, wherein, when one of the unit pixels includes at least one phase difference pixel, the image-signal generating section generates a combined pixel signal by performing interpolation processing using the pixel signals for an image in a vicinity of the at least one phase difference pixel.

9. The image pickup device according to claim 1, wherein, when one of the unit pixels includes at least one phase difference pixel, the image-signal generating section generates a combined pixel signal by combining the at least one phase difference pixel and the pixels for an image included in the unit pixel.

* * * * *